United States Patent [19]

Belke et al.

[11] 4,282,009
[45] Aug. 4, 1981

[54] ROTATING FLUIDIZED BED GASIFIER SYSTEM

[75] Inventors: William H. Belke, Peoria; Alexander Goloff, East Peoria; George B. Grim, Washington, all of Ill.

[73] Assignee: Caterpillar Tractor Co., Peoria, Ill.

[21] Appl. No.: 99,136

[22] PCT Filed: Nov. 1, 1979

[86] PCT No.: PCT/US79/00929

§ 371 Date: Nov. 1, 1979

§ 102(e) Date: Nov. 1, 1979

[87] PCT Pub. No. WO81/01295

PCT Pub. Date: May 14, 1981

[51] Int. Cl.$^3$ .............................................. C10J 3/56
[52] U.S. Cl. ........................................... 48/61; 48/63;
48/73; 48/76; 48/77; 60/39.12; 60/39.35;
110/229; 110/234; 110/246; 122/11; 422/139;
422/145
[58] Field of Search ................... 48/61, 62 R, 63, 64,
48/67, 68, 69, 73, 76, 77, 85.1, 89, 99, 101;
34/57 R, 57 D; 60/39.12, 39.35, 39.46 S;
110/229, 234, 246; 122/11; 266/172, 173;
422/139, 145; 432/58; 431/7; 165/104 F

[56] References Cited

U.S. PATENT DOCUMENTS 4,183,208  1/1980  Horgan et al. ................... 60/39.12

OTHER PUBLICATIONS

Swithenbank, Rotating Fluidized Bed Combustor/Gasifier, University of Sheffield, 1976.

Primary Examiner—Peter F. Kratz
Attorney, Agent, or Firm—Sixbey, Friedman & Leedom

[57] ABSTRACT

A rotating fluidized bed gasifier system especially useful in compound engines comprising an annular fluidization chamber containing a bed of carbon containing pulverulent solid materials. The chamber, which is defined by inner and outer spaced apart coaxial, cylindrical, perforated walls, rotates about the longitudinal axis of the cylinders. Steam enters the bed, which is maintained at about 1800° F., through the outer perforated wall and fluidizes the particles. The steam reacts endothermically with the carbon to produce reaction product gas which exits the bed, together with unreacted steam, through the inner perforated wall. In a preferred form of the invention the bed is maintained at approximately 1800° F. by combining a rotating fluidized bed combustor with the gasifier. In this embodiment compressed air and powdered coal enter the bed with the steam through the outer perforated wall. The air reacts exothermically with the fuel within the bed to generate heat for the endothermic steam-carbon reaction and to produce hot combustion gas which exit the bed, together with the reaction product gas, unreacted steam and compressed air, through the inner perforated wall.

6 Claims, 2 Drawing Figures

ROTATING FLUIDIZED BED GASIFIER SYSTEM

DESCRIPTION

1. Technical Field

The present invention relates generally to fluidized bed gasifiers systems and, more particularly, to rotating fluidized bed gasifiers systems especially useful in compound engines.

2. Background Art

In recent years fluidized beds have found many diverse uses in power generating systems and chemical processes. They have served as chemical reactors, particularly for finely divided materials; as incinerators for liquid, solid or gaseous substances; as pressurized or atomspheric, coal-, lignite-, petroleum-, peat-, wood- and/or paper-fired boiler or combustor units for power generation; and, as sites for various process treatments such as drying, baking, coating, oxidizing, etc.

Typically, fluidized beds which are in use today are static beds established when air or other fluidizing gas is introduced into a plenum chamber under pressure and forced upwardly through a diffusing medium (e.g., membrane, grate) to a superimposed chamber containing a particulate bed, of inert or reactive, finely divided, pulverulent solid material, Gas, forced upwardly through the diffusing medium into the fluidizing chamber under a sufficient predetermined pressure, fluidizes the particulates. The gas pressure requied to accomplish this is determined, in part, by the nature and degree of fineness of the powder to be fluidized. Other influencing factors are the depth of the bed and the size, number and design of the plenum chamber compartments and passages into the superimposed fluidizing chamber.

The rate at which an endothermic chemical reaction takes place in a fluidized bed between a solid material and a gaseous agent depends to a major extent on the rate at which the reactants are brought together, the rate at which the heat of reaction is funished and the rate at which the reaction products are removed. By and large the gaseous agent also serves as the fluidizing agent. In conventional static fluidized beds, the rate at which the fluidizing gaseous agent can be blown through the bed is limited by the fact that the fluidizing currents within the fluidized zone are vertical, i.e., only the gravity force on the bed particles opposes the balancing gaseous agent force needed to maintain fluidization. If the force opposing the balancing fluidizing force could be increased, then the fluidizing agent flow rate through the bed and the reaction rate of the system would be increased. This can be accomplished using rotating fluidizing beds wherein the fluidizing gaseous agent forced through the bed from its periphery opposes the centrifugal force tending to throw the bed particles outwardly from the bed axis of rotation toward the bed periphery. The extent of the centrifugal force and, thus, of the opposing fluidizing gaseous agent rate can be controlled by controlling the speed of bed rotation.

Gasifiers, in which steam typically reacts with carbon (coal) to form carbon monoxide and hydrogen, may be fluidized beds in which the steam fluidizes a bed containing carbon and the endothermic reaction takes place at temperatures of at least about 1800° F. These high temperatures are advantageously achieved by channeling the heat generated in a combustor from a conventional carbon-oxygen exothermic reaction into the gasifier fluidized bed. The chemical reactions are well known and proceed generally as follows:

In the combustor:

$$C + O_2 \rightarrow CO_2 + 174{,}000 \text{ BTU/mole}$$

In the gasifier:

$$C + H_2O + 54{,}000 \text{ BTU/mole} \rightarrow CO + H_2$$

$$C + 2H_2O + 40{,}000 \text{ BTU/mole} \rightarrow CO_2 + 2H_2$$

As a result of increasing the reaction rate due to the ability to increase the steam feed rate, rotating fluidizing beds used as gasifiers, e.g., in conventional compound engines, are extremely compact and can much more readily be integrated into powerplants. In some applications where size is critical this can be a considerable advantage, especially when the gasifier is combined with a combustor which burns fuels inherently requiring large volumes, such as powdered coal.

A form of rotating fluidized bed combustor system has been suggested by J. Swithenbank in his article "Rotating Fluidized Bed Combustor/Gasifier". The Swithenbank system includes a vertical shaft around which rotates a generally cylindrical combustor using natural gas as the fuel. The gas in introduced at the center of the combustor, i.e., along the axis of rotation, and is mixed with fluidizing air forced through the bed particles from the bed periphery toward the center. The bed, which is heated by the combustion heat generated and the mixing action accompanying rotation, preheats the entering fluidizing air. Most of the combustion between the heated air and the natural gas appears to occur outside, rather than within, the bed itself. Cooling coils passing through the bed carry air which is heated by the combustion and serve to control the bed and exhaust gas temperature. Swithenbank states that his combustion system may be operated by burning or gasifying coal granules in the fluidized bed, but discloses no combustor configuration suitable for use with coal fuels. Moreover, Swithenbank's configuration, requiring introduction of the fuel along the axis of rotation, detracts from the attainment of maximum energy density because it diminishes the compactness of the system. See also, Demircan et al, *Rotating Fluidized Bed Combustor*, published in "Fluidization" by Cambridge University Press (1978). Other publications of interest in connection with the heat transfer and combustion characteristics of natural gas fueled rotating fluidized beds are J. Broughton and G. E. Elliott, *Heat Transfer and Combustion in Centrifugal Fluidized Bed*, I. Chem E. Symposium Series No. 43 (paper presented at June, 1975 meeting) and G. C. Lindauer et al, *Experimental Studies on High Gravity Rotating Fluidized Bed*, U.S. Atomic Energy Commission, BNL-50013 (Sept. 1966).

Gasifiers are particularly desirable stages to include in powerplants since the water in the system serves to deter the formation of nitrous oxide type emissions in the combustion gases. However, due to the high thermal input requirement of gasifiers it has proven difficult to devise a gasifier and thermal source which is particularly compact. Accordingly, the present invention is directed to overcoming one or more of the problems as set forth above.

DISCLOSURE OF INVENTION

In one aspect of the present invention this is accomplished by providing a rotating fluidized bed gasifier including a fluidization chamber in whch steam reacts with a carbon containing bed of pulverulent solid particles as it is forced through the bed. The bed particles are fluidized by a gaseous agent forced through the chamber in the same direction as the steam. The gaseous reaction products and unreacted steam exit the chamber and are directed away therefrom.

In another aspect of the invention, the chamber includes first and second spaced apart apertured or perforated walls, means are provided for rotating the chamber about an axis to cause the bed particles to centrifugally gravitate toward the first perforated wall, the steam is forced into the chamber through the first perforated wall and the reaction products and unreacted steam exit the chamber through the second perforated wall.

In a particularly preferred form of the invention, the rotating fluidized bed gasifier is combined with a rotating fluidizing bed combustor for outstanding compactness. The first and second walls are substantially cylindrical and comprise the outer and inner coaxial walls, respectively, of the fluidization chamber. As the chamber is rotated about its axis, the bed particles centrifugally gravitates toward the outer wall. Compressed air, a combustible fuel and steam, enter the chamber through the outer perforated wall and fluidize the bed particles. Generally, the fuel is fed to the fluidized bed with the air stream, particularly if the fuel is solid, such as powdered coal. The air reacts with the fuel to form hot combustion gases and to raise the bed temperature to at least about 1800° F. At this temperature the steam reacts with the carbon to form the gaseous reaction products which exit the fluidized bed with the hot combustion gases and unreacted steam and air through the perforated inner wall.

In an especially useful application, the rotating fluidized bed gasifier-combustion combination of the present invention is employed as a hot gas generator in a conventional compound engine. The compressed air is furnished to the gasifier combustor by one or more turbo and/or positive displacement compressors and the generated gases and unreacted air and steam exiting the fluidization chamber are directed into and through one or more turbo and/or positive displacement expanders.

BEST MODE FOR CARRYING OUT THE INVENTION

Figure 1:
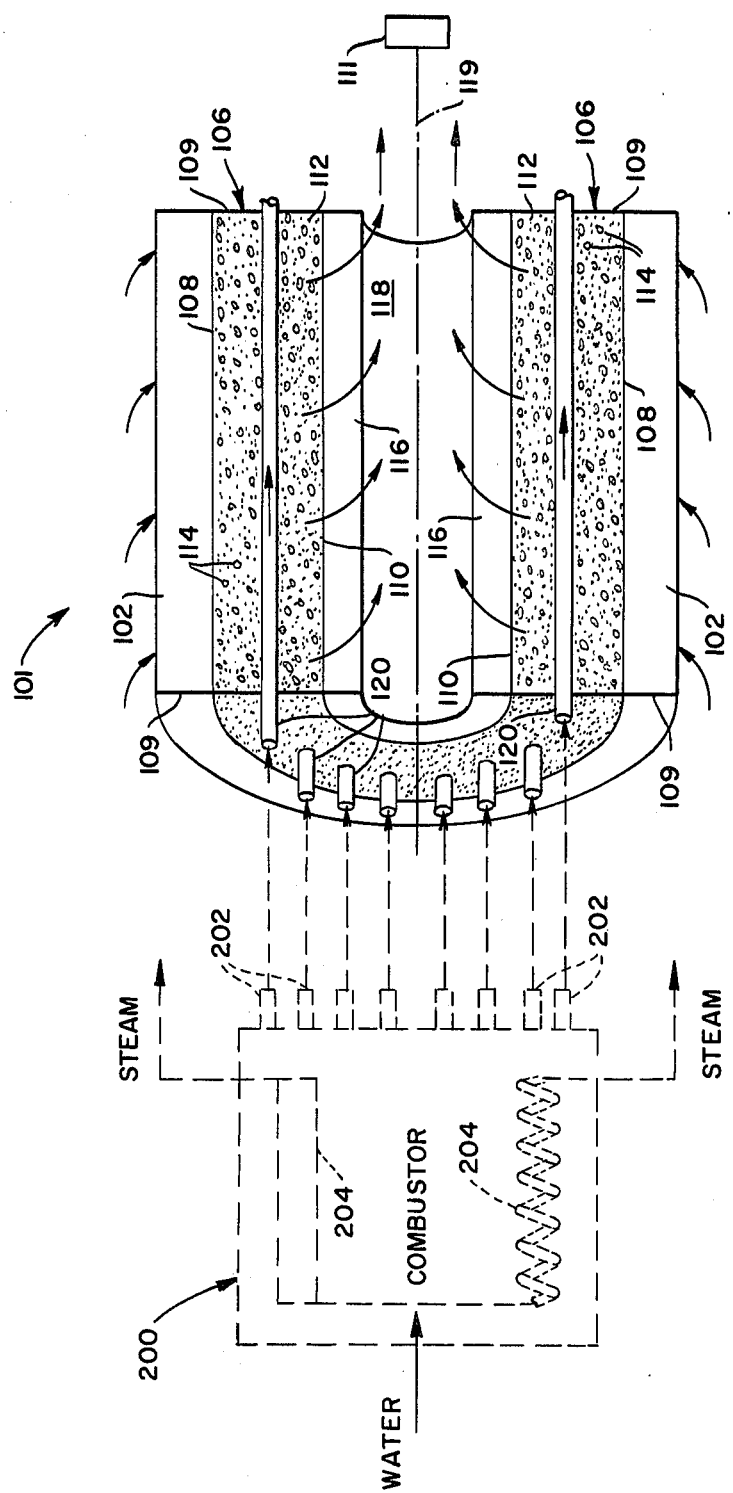
FIG. 1 is a schematically simplified sectional view of one embodiment of the fluidized bed gasifier system of the present invention.

The rotating fluidized bed gasifier system of the present invention has wide utility whereever gasifiers may be used but, due to its outstanding compactness, is particularly adaptable for integration into powerplants, whether stationary or mobile. Referring to FIG. 1 a preferred form of rotating fluidized bed gasifier 101 of the present invention is more clearly depicted. As can be seen in detail the gasifier 101 includes an inlet plenum chamber 102 into which steam passes before it is directed through the rotating fluidized bed portion 106 of the gasifier as the fluidizing medium therefor and to react with the carbon content of the bed particles. In a preferred embodiment the bed particles include powdered coal, desirably solvent refined coal to minimize ash removal problems. In an alternative form of the invention a gaseous agent, such as compressed air, may be fed to the bed to fluidize or assist in fluidizing the bed particles. The steam reacts with the carbon in the bed at temperatures of about 1800° F. to form carbon monoxide and/or carbon dioxide and hydrogen as reaction products which exit the fluidized bed portion 106 through outlet plenum chamber 116 and are thereafter directed away therefrom.

The rotating fluidized bed portion 106 comprises an outer perforated cylindrical wall 108, an inner perforated cylindrical wall 110 and appropriate enclosing walls 109 defining therebetween an annular fluidizing chamber 112 in which pulverulent solid particles 114 are disposed. The perforations in walls 108 and 110 are small enough to contain particles 114 within chamber 112 and to control the exhaust of solid reaction products but large enough to sustain the free flow of steam and/or fluidizing air from the inlet plenum chamber 102 through wall 108, into and through chamber 112, through wall 110 and into outlet plenum chamber 116. The fluidized bed portion 106 rotates on horizontal, vertical or other appropriate axis, preferably about a longitudinal axis 119 which corresponds to the axis of coaxial cylindrical walls 108, 110. Rotation is motivated by available rotational means 111, such as appropriate gearing to drives for other conventional engine functions, and is controlled to a speed sufficient to impart a centrifugal force to the particles 114 within the bed. The centrifugal force causes the particles 114 to gravitate away from axis 119 toward outer perforated wall 108. The flow of fluidizing steam from inlet plenum chamber 102 through perforated outer wall 108 opposes the centrifugally induced movement of the particles 114 and, in so doing, fluidizes the bed. As long as temperatures within the fluidized bed are maintained sufficiently high for the desired gasification reaction to occur, e.g. about 1800° F. to generate carbon monoxide and hydrogen, reaction occurs within the fluidizing chamber 112 between the fluidizing steam and the carbon particles, e.g., powdered coal, in the bed to produce hot reaction product gases within the bed. These hot reaction product gases are swept out of the bed through inner perforated wall 110 by the continuing flow of fluidizing steam through the bed. The unreacted fluidizing steam and the hot reaction product gases pass from outlet plenum chamber 116 into the core 118 of the gasifier 101. In the preferred embodiment, core 118 is an elongated cylindrical chamber which directs the flow of unreacted fluidizing steam and reaction product gases through turbo and/or positive displacement expanders to produce useful engine work output.

The bed particles 114 are preferably an admixture of inert materials, e.g., sand, dolomite, other sulfur absorbers, or any other inert material generally found suitable for use in fluidized beds, and a carbonaceous fuel, such as powdered coal. For example, a suitable combination of materials comprises a particulate mixture of coal, dolomite, sand and coal ash. A generally useful proportion of bed particles is 95% inert materials, 5% fuel. As the reaction with steam proceeds, coal ash is formed and becomes either a part of the inert particulate portion of the bed or passes out of the bed through the inner perforated wall 110 with the unreacted fluidizing steam and reaction product gases. Any ash which passes out of the bed may be removed from the gas stream by a cyclone separator, not shown. Ash and sulfur remaining in the bed will eventually have to be circulated to a cleaning reclaiming device, not shown. If solvent refined coal is used, ash and sulfur removal is generally not a problem since this type of coal permits operation for lengthy periods without any interruption. From time to time the carbon content of the bed will have to be replenished. This may be accomplished by known conventional techniques or by the carbon addition and bed replenishment method discussed in connection with FIG. 2 hereof.

The temperature within the bed may be controlled in any desired manner. Desirably bed temperature is controlled by controlling the amount of heat transferred to the bed from tubes (or coils) 120 which pass substantially longitudinally through the bed. The tubes 120 may, if desired, rotate with the bed portion 106 and are supplied with a high temperature fluid from a heat source, such as combustor 200 shown in phantom in FIG. 1. The combustor may be conventional in design or may be a fluidized bed type. Thermal energy generated in the combustor 200 is transferred to the gasifier 101 by heat pipes 202 which are in thermal communication with tubes 120. It is recommended to control the temperature of the gasifier bed to about 1800° F. To accomplish this, as a practical matter, the combustor 200 will have to operate at a considerably higher temperature, e.g. at about 2200° F. The combustor 200 may also be used to furnish thermal energy from the combustor products to water fed to tubes or coils 204 to produce the steam used as the fluidizing agent and reactant in the gasifier. In an alternative embodiment a stationary heat exchanger (not shown) may be employed to furnish thermal energy from the hot combustor gases to water and air. The water is converted to steam for use in the gasifier while the heated air is directed to the combustor as a reactant in the combustion process.

Figure 2:
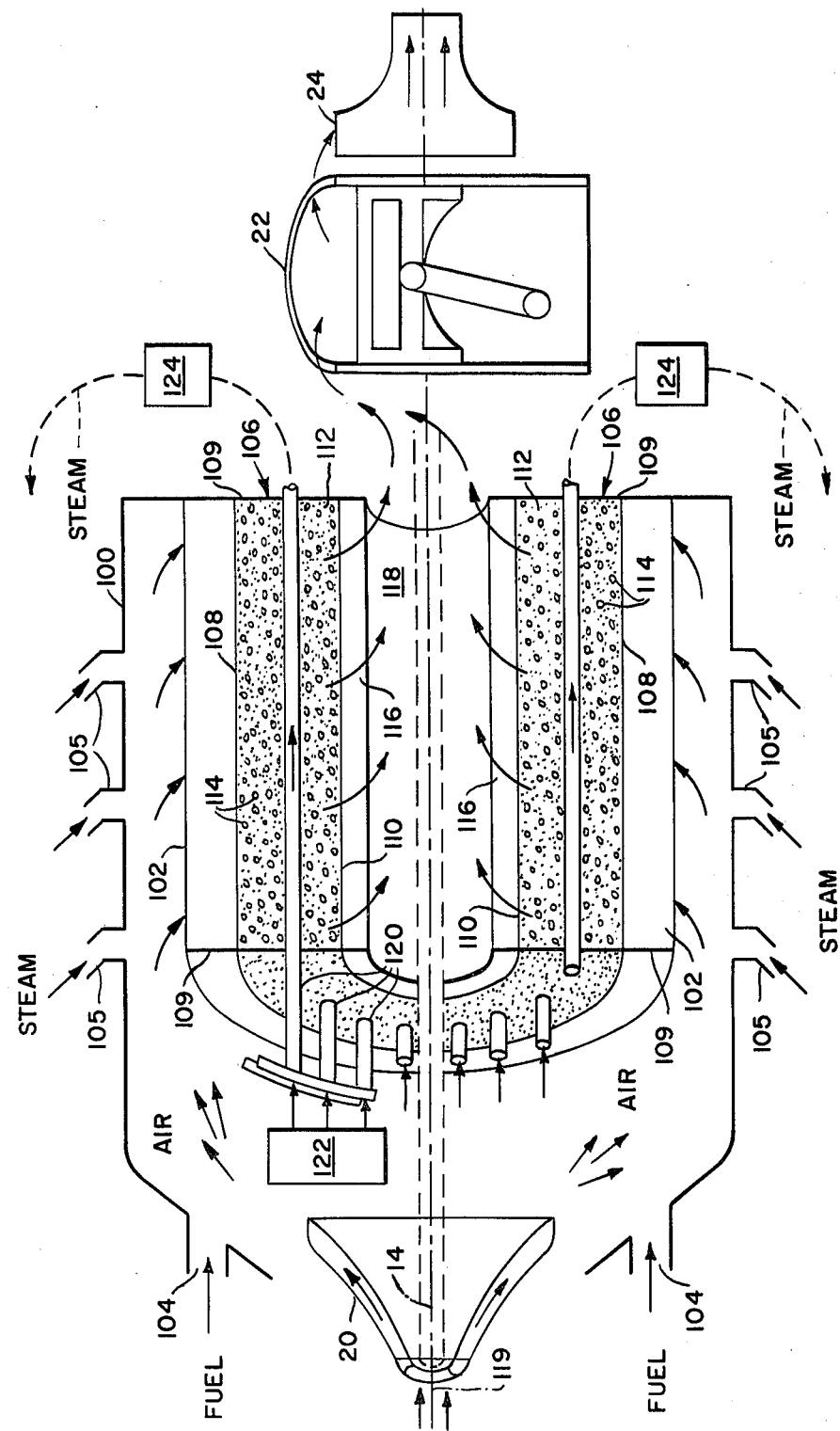
FIG. 2 is a side elevational schematic view of a combined rotating fluidized bed gasifier-combustor of the present invention showing the use thereof in a conventional compound engine system.

In a most preferred embodiment, the rotating fluidized bed gasifier of the present invention is combined with a combustor, desirably of the rotating fluidized bed type, which generates the thermal energy to achieve the at least 1800° F. temperatures needed within the gasifier. The resulting combination is so outstandingly compact that it is readily incorporated as the hot power gas generation source in integrated powerplants. With reference to FIG. 2 the combined fluidized bed gasifier-combustor of the present invention is shown in combination with exemplary compressor and expander elements of an otherwise conventional compound engine. The gasifier-combustor system includes a compressor means 20, which may include one or more turbo and/or positive displacement compressors, for furnishing compressed air to the gasifier-combustor and expander means 22, 24, which may include one or more turbo and/or positive displacement expanders, for producing useful work from the hot combustion and reaction product gases exiting the gasifier-combustor. In some instances it may be desirable to integrally associate at least one compressor and one expander via a shaft assembly 14 to provide a means for driving the compressor. In such a case the rotating fluidized bed gasifier-combustor is advantageously mounted for rotation about the shaft assembly 14.

Continuing with reference to FIG. 2 the rotating fluidized bed gasifier-combustor includes a housing 100 through which passes a rotatable shaft assembly, such as shaft assembly 14. Compressed air is ducted within housing 100 into inlet plenum chamber 102. The compressed air is desirably preheated air, such as exits the recuperator section of a gas turbine engine. Fuel fed through entry port 104 is mixed with the compressed air prior to entering the inlet plenum chamber 102 and is conveyed by the air to the rotating fluidized bed portion 106 of the gasifier-combustor. In a preferred embodiment the fuel is powdered coal, desirably solvent refined coal to minimize ash removal problems. As in the gasifier embodiment described in connection with FIG. 1, steam is fed via stream inlets 105 to the rotating fluidized bed portion 106 via inlet plenum chamber 102. The fluidized bed portion 106 is the same as has been described in connection with FIG. 1. Inasmuch as at least some combustion will occur within the bed, the perforations in walls 108 and 110 should be small enough to control the exhaust of solid combustion products which may be formed but large enough to permit the entry of powdered fuel as well as to sustain the free flow of fluidizing air and steam from the inlet plenum chamber 102. Combustion occurs within the fluidizing chamber 112 between the fluidizing air and the fuel, e.g., powdered coal, to produce hot combustion gases within the bed. Combustion may also occur outside the fluidizing chamber 112, for example within elongated cylindrical core chamber 118.

Most importantly in connection with the FIG. 2 embodiment, the combustion of the powdered coal and fluidizing air is an exothermic reaction which produces, in situ, approximately 174,000 BTU/mole of carbon combusted. This large generation of heat within or immediately adjacent fluidization chamber 112 rapidly raises the temperature within the bed to the about 1800° F. range desired for the endothermic gasification reaction between the carbon particles in the bed and the steam. The gasification reactions which take place produce hot reaction product gases, namely carbon monoxide, carbon dioxide and hydrogen, within the bed. The hot combustion and reaction product gases produced within the chamber 112 are swept out of the bed through inner perforated wall 110 by the flow of fluidizing air and stream through the bed. The unreacted fluidizing air and steam and the hot combustion and reaction product gases pass from outlet plenum chamber 116 into core 118 where they admix with any combustion gases which may have formed as a result of combustion within core 118. In the preferred embodiment, where the gasifier-combustor of the present invention is used in connection with a conventional powerplant, core 118 directs the flow of unreacted fluidizing air, unreacted steam and combustion and reaction product gases gases through positive displacement reciprocating expander 22. The expander exhaust gases may usefully be further expanded by passage through the vanes or blades of turbine 24.

The combustion temperature within the gasifier-combustor bed is controlled in part by the ratio of air to fuel fed into the bed. In addition, bed temperature may be controlled by controlling the amount of heat transferred from the bed tubes (or coils) 120 which pass substantially longitudinally through the bed. The tubes 120 may, if desired, be used to generate steam from water supplied thereto from steam/water supply source 122. Alternatively, tubes 120 may be used to superheat steam furnished by source 122 thereto. The resulting steam exiting tubes 120 may be collected or recovered in steam collection chamber 124 and optionally be directed into inlet plenum chamber 102 to comprise all or a part of the steam supply to the gasifier-combustor. By pre-determining the rate of flow of water or steam through the bed, localized temperatures within the bed are readily controlled. It is recommended to control the temperature of the bed in such a manner that carbon-water gasification reaction temperatures of at least about 1800° F. are maintained in at least portions of the bed.

INDUSTRIAL APPLICABILITY

The rotating fluidized bed gasifier of the present invention has broad applicability but is particularly useful as a gasifier-combustor incorporated in conventional powerplants such as compound engines. When operating in this capacity the fluidized bed portion 106 preferably rotates about the same axis, shaft assembly 14, on which compressor and expander elements are mounted, and rotation is motivated by suitable gearing to other conventional engine functions. Upon rotation of the shaft assembly 14, the compressor means 20 draws air, preferably heated air, into housing 100, compresses the air, and directs the air flow into inlet plenum chamber 102. Steam is also fed via inlets 105 to inlet planum chamber 102. Powdered coal fuel is fed through entry port 104 into the heated compressed air stream and is conveyed with the air stream and steam flow via inlet plenum chamber 102 through perforated outer wall 108 into fluidization chamber 112. Inasmuch as the rotation of fluidized bed portion 106 causes the particles 114 within chamber 112, which are an admixture of carbon and inert materials, to gravitate toward outer wall 108, the opposing flow of the compressed air stream and steam into the chamber 112 fluidizes the particles. Combustion occurs within fluidizing chamber 112 between the compressed air and the powdered coal fuel to produce hot combustion gases and thermal energy within the bed. This raises the temperature of the bed to the approximately 1800° F. range desired for the endothermic gasification reaction between the carbon particles in the bed and the steam. The gasification reactions which take place produce hot reaction product gases which are swept out of the bed together with the hot combustion gases and the unreacted air and steam through inner perforated wall 110 by the flow of fluidizing compressed air and steam through the bed. The unreacted compressed air, unreacted steam and the hot combustion and reaction product gases pass through outlet plenum chamber 116 into core 118 and are directed through positive displacement reciprocating expander 22 and then through the vanes of turbine 24 to drive the expander-turbine combination and, through shaft 14, to drive compressor means 20 as well. Temperatures within the bed portion 106 may be controlled and steam for feeding to the gasifier-combustor may be produced by directing water or steam through tubes 120 which extend longitudinally through bed portion 106.

Various configuration compound engines are contempated. For example, the compressor means 20 may advantageously consist of two centrifugal stages, each having, e.g., a 3.5:1 compression ratio followed by a positive displacement stage capable of handling higher pressures, e.g., about 5-6:1 compression ratio, to produce a final pressure of about 1000 psig. The compressors may be of any type, e.g., reciprocating, rotary, etc.. Intercoolers may be advantageously used between compressor stages. Reciprocating compressors and expanders may be logically incorporated into a single engine block with half the cylinders running as compressors and the other half operating as expanders. The two centrifugal compressors may also usefully operate on the same shaft as two turbines, all coupled to the crank, or, in some situations, even running free as a turbocharger. An exhaust gas boiler can generate steam which is directed to the tubes 120 of the gasifier-combustor to become superheated and/or to act as a temperature control in the bed.

Other aspects, objects and advantages of this invention can be obtained from a study of the drawings, the disclosure and the appended claims.

We claim:

1. A rotating fluidized bed gasifier system for endothermically reacting steam and carbon comprising:
   a. an outer substantially cylindrical elongated perforated wall (108);
   b. an inner substantially cylindrical perforated wall (110) spaced apart and substantially coaxial and co-extensive with said outer perforated wall (108);
   c. enclosing walls (109) defining within said outer and inner perforated walls (108, 110) a substantially annular fluidization chamber (112);
   d. a fluidizable bed of pulverulent solid particles (114) in said chamber (112), said particles comprising a minor proportion of carbon particles and a major proportion of inert particles;
   e. means (111) for rotating said chamber (112) about the axis (119) to cause the particles to centrifugally gravitate toward said outer perforated wall (108);
   f. means (20, 104, 102) for feeding a combustible fuel in a gaseous agent stream into said chamber (112) through said outer perforated wall (108), said fuel reacting with at least a portion of said gaseous agent in said chamber (112) to generate heat and to form gaseous combustion products, any unreacted gaseous agent and said gaseous combustion products exiting said chamber (112) through said inner perforated wall (110);
   g. means (105,102) for introducing steam through said outer perforated wall (108) into said chamber (112), said steam reacting with at least a portion of said carbon particles in said chamber (112) to form gaseous reaction products, said gaseous reaction products exiting said chamber (112) through said inner perforated wall (110);
   h. means (120) for maintaining at least a portion of said particles (114) in said chamber (112) at a temperature conducive to said steam-carbon reaction;
   i. means (116) for receiving said gaseous reaction products, gaseous combustion products, unreacted gaseous agent and unreacted steam exiting from said chamber (112) through said inner perforated wall (110); and
   j. means (118), communicating with said means (116) for receiving, for directing said unreacted steam, unreacted gaseous agent, gaseous combustion products and gaseous reaction products exiting said inner perforated wall (110) away from said chamber (112).

2. A gasifier system, as claimed in claim 1, wherein said means for maintaining a temperature conducive to said steam-carbon reaction includes at least one tube (120) extending substantially longitudinally through said chamber (112) for passing a heat exchange fluid therethrough.

3. A gasifier system, as claimed in claim 1, wherein said means for feeding includes chamber means (102) communicating with said outer perforated wall (108), for combining said fuel with said gaseous agent prior to feeding said agent through said outer perforated wall (108).

4. A gasifier system, as claimed in claim 1, wherein said means for feeding includes compressor means (20), operatively associated with said chamber (112), for providing compressed air as said gaseous agent to said chamber and further including expander means (22, 24), operatively associated with said means (118) for directing, for converting the energy of said gaseous combustion and reaction products and unreacted steam and compressed air to output work.

5. A gasifier system, as claimed in claim 1, wherein said means for introducing steam (105, 102) includes said at least one tube (120) extending substantially longitudinally through said chamber (112), means (122) for passing water or steam into said at least one tube (120), means (124) for recovering steam therefrom and means (105, 102) for directing said steam into said chamber (112).

6. A gasifier system, as claimed in claim 1, 2, 3, 4, or 5, wherein the substantially cylindrical space enclosed by said inner perforated wall (110) comprises said means (116) for receiving and means (118) for directing said unreacted steam, unreacted gaseous agent, gaseous combustion products and said gaseous reaction products away from said chamber (112).

* * * * *